United States Patent [19]

Aoki et al.

[11] Patent Number: 4,497,543

[45] Date of Patent: Feb. 5, 1985

[54] LIQUID CRYSTAL DISPLAY WITH COLORS FROM DYE AND POLARIZER MIXED

[75] Inventors: Shigeo Aoki, Habikino; Junichi Tamamura, Yao; Yasuhiro Ukai, Yao; Hideo Morita, Yao, all of Japan

[73] Assignee: Hosiden Electronics Co., Ltd., Osaka, Japan

[21] Appl. No.: 269,211

[22] Filed: Jun. 2, 1981

[30] Foreign Application Priority Data

Jun. 28, 1980 [JP] Japan .................................. 55-88274

[51] Int. Cl.$^3$ .............................................. G02F 1/133
[52] U.S. Cl. ...................................... 350/337; 350/340; 350/349
[58] Field of Search ....................... 350/349, 340, 337; 252/299.1

[56] References Cited

U.S. PATENT DOCUMENTS

| | | | |
|---|---|---|---|
| 3,864,022 | 2/1974 | Moriyama et al. | 350/349 |
| 3,960,750 | 6/1976 | Moriyama et al. | 350/349 X |
| 4,025,164 | 5/1977 | Doriguzzi et al. | 350/337 |
| 4,241,339 | 12/1980 | Ushiyama | 350/337 X |
| 4,257,682 | 3/1981 | Suzuki et al. | 350/340 X |

FOREIGN PATENT DOCUMENTS 0043047 5/1979 Japan .................................. 350/349

*Primary Examiner*—John K. Corbin
*Assistant Examiner*—David Lewis
*Attorney, Agent, or Firm*—Pollock, Vande Sande and Priddy

[57] ABSTRACT

A liquid crystal display element which is composed of a TN liquid crystal cell containing nematic liquid crystal of positive dielectric anisotropy and an N type dye having the same long molecular axes as the liquid crystal and polarizing plates respectively disposed opposite both side plates of the liquid crystal cell. The polarizing plates each have the direction of polarization substantially parallel to the orientation of molecules of the liquid crystal near the side plate of the liquid crystal which each polarizing plate confronts, and one of the polarizing plates is a color polarizing plate.

6 Claims, 13 Drawing Figures

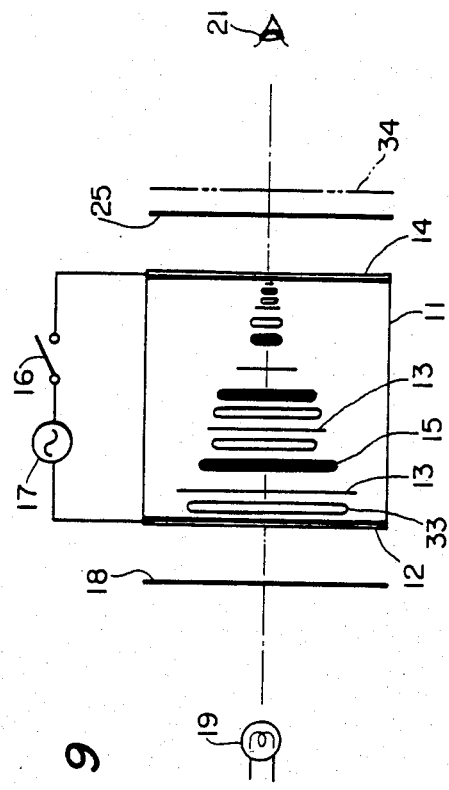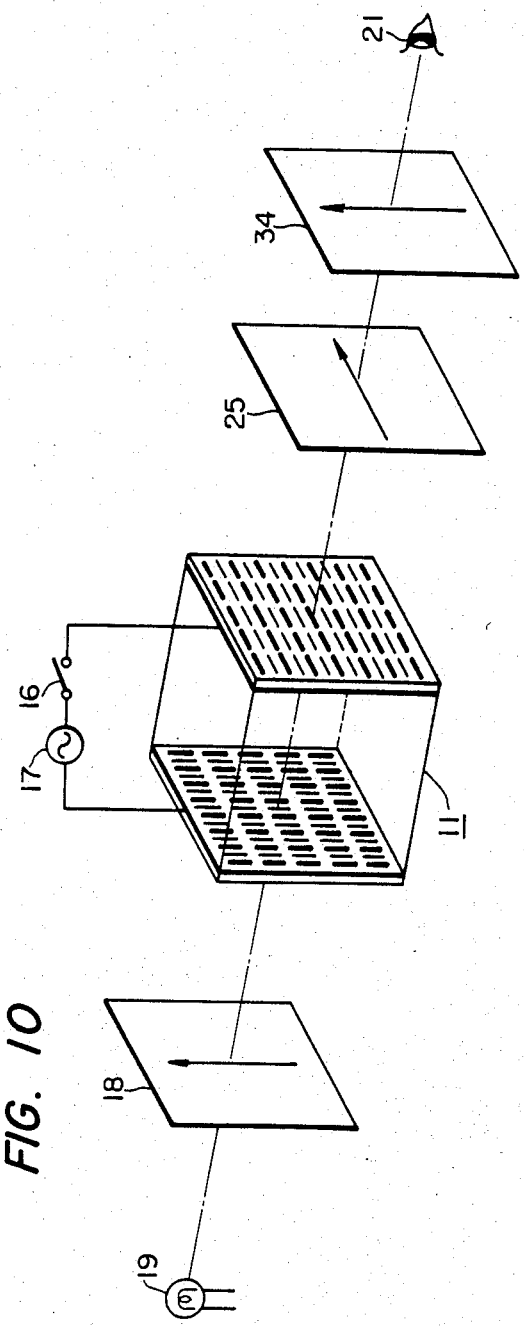
FIG. 9
FIG. 10

LIQUID CRYSTAL DISPLAY WITH COLORS FROM DYE AND POLARIZER MIXED

BACKGROUND OF THE INVENTION

The present invention relates to a liquid crystal display element which is designed to provide a colored display by applying a voltage to a twisted type liquid crystal cell which contains liquid crystal and an N type dichroic dye and in which the orientation of molecules of the liquid crystal on one of opposite side plates of the cell is substantially perpendicular to the orientation of the molecules on the other side plate and molecules of the dye have the same orientation as the molecules of the liquid crystal.

Heretofore, there has been proposed a positive type color liquid crystal display element which contains in a liquid crystal cell an N type dye together with a nematic liquid crystal of positive dielectric anisotropy, and a pattern provided on an electrode is displayed by the application of a voltage to the liquid crystal cell. With this conventional liquid crystal display element, when incident light on one side plate of the liquid crystal cell is linearly polarized light whose plane of polarization is the same as the direction of the long axes of molecules of the liquid crystal near the abovesaid side plate of the liquid cell, the display element appears colorless on the side of the other side plate. In such a state, if a voltage is applied to the liquid crystal cell, the direction of the long axes of the molecules of the liquid crystal and the dye becomes perpendicular to the side plate of the cell and components of a certain wavelength in the incident light are absorbed by the molecules of the dye, making the display element appear to be colored. In this prior art liquid crystal display element, the color of the display is changed by selecting the dye which is mixed in the liquid crystal cell but, at present, the display is produced only in purple. Further, this display element has poor contrast because of the small difference between the transmissivity in the presence of an electric field produced by the application of a voltage to the liquid crystal cell and the transmissivity in the absence of such a field.

There has also been proposed a liquid crystal display element of the type that employs a cell containing nematic liquid crystal of positive dielectric anisotropy with no dye mixed therein and a color polarizing plate. In this display element, the direction of polarization of the color polarizing plate, which is disposed on the side of its display surface, is parallel to the direction of the long axes of molecules of the liquid crystal near the side plate of the cell which the color polarizing plate confronts. When no voltage is provided to the liquid crystal cell, light of all color components passes through the liquid crystal cell and the color polarizing plate, with the result that the display element appears to be colorless. When a voltage is applied to the liquid crystal cell, since the direction of polarization of light passing through the liquid crystal cell is not rotated, light of only the color component of the color polarizing plate passes therethrough, making the display element appear in the color of the color polarizing plate. This liquid crystal display element is capable of producing displays in various kinds of colors by selecting the color of the color polarizing plate and has relatively good contrast. Since this liquid crystal display element makes use of the polarizing characteristic of the color polarizing plate, however, in the angle over which the display can be seen correctly is small, that is, small in what is called the angle of visual field, and hence it has the defect that the display cannot be seen from an oblique direction, even if only slightly oblique.

SUMMARY OF THE INVENTION

It is an object of the present invention to provide a liquid crystal display element which has good contrast and a large angle of visual field and allows ease in the selection of the color to be displayed.

Another object of the present invention is to provide a liquid crystal display element which produces a colored pattern display on a background of a color different from that of the display.

According to the present invention, the liquid crystal display element employs at least a liquid crystal cell containing nematic liquid crystal of positive dielectric anisotropy and an N type dichroic dye having the same orientation of molecules as that of molecules of the liquid crystal, and a color polarizing plate. The liquid crystal cell is what is called a 90° or 270° TN (Twisted Nematic) orientation cell in which the direction of the long axes of the molecules of the liquid crystal in the vicinity of each of two opposed side plates of the cell is perpendicular to the direction of the long axes near the other side plate. On one of the side plates of the liquid crystal cell is incident linearly polarized light which is parallel to the direction of the long axes of the molecules of the liquid crystal near that side plate. Opposite the other side plate of the cell is disposed the color polarizing plate, the direction of polarization of which is parallel to the direction of the long axes of the molecules of the liquid crystal near the side plate which the color polarizing plate confronts. The incident light undergoes rotation of its direction of polarization while passing through the liquid crystal cell and the light having passed therethrough is incident on the color polarizing plate in the same direction as its direction of polarization and passes therethrough. Consequently, the liquid crystal display element appears to be colorless on the side of the color polarizing plate. When a voltage is applied to the liquid crystal cell, the direction of the long axes of the molecules of the liquid crystal becomes approximately perpendicular to the side plates of the cell and the incident light is not rotated in its direction of polarization while passing through the liquid crystal cell. Consequently, the direction of polarization of the light incident on the color polarizing plate is at right angles to its direction of polarization and light of only the same color component as that of the color polarizing plate passes therethrough, making the liquid crystal display element appear in the color of the color polarizing plate.

As described above, the liquid crystal display element produces a colored display by the combined use of the N type dye mixed in the liquid crystal cell and the color polarizing plate, and hence it has good contrast. Even when observed from an oblique direction, the pattern being displayed can be seen though its color varies a little; namely, the display can be provided over a wide angle of visual field. Further, the display can be provided in various colors by selecting the color of the color polarizing plate used. It is also possible to provide a colored display of a pattern and, at the same time, to display the background in a color different from that of the pattern by additionally mixing in the liquid crystal cell a P type dye the molecules of which have the same orientation as the molecules of the liquid crystal. This can also be achieved by disposing opposite the aforementioned color polarizing plate another color polarizing plate which is perpendicular thereto in direction of polarization and different therefrom in color.

BRIEF DESCRIPTION OF THE DRAWINGS

FIG. 9 is a diagram illustrating an example of the arrangement of the liquid crystal display element of the present invention which employs a P type dye in the liquid crystal cell;

FIG. 10 is a diagram illustrating an example of the arrangement of the liquid crystal display element of the present invention which employs two color polarizing plates;

DESCRIPTION OF THE PREFERRED EMBODIMENTS

Figure 1:
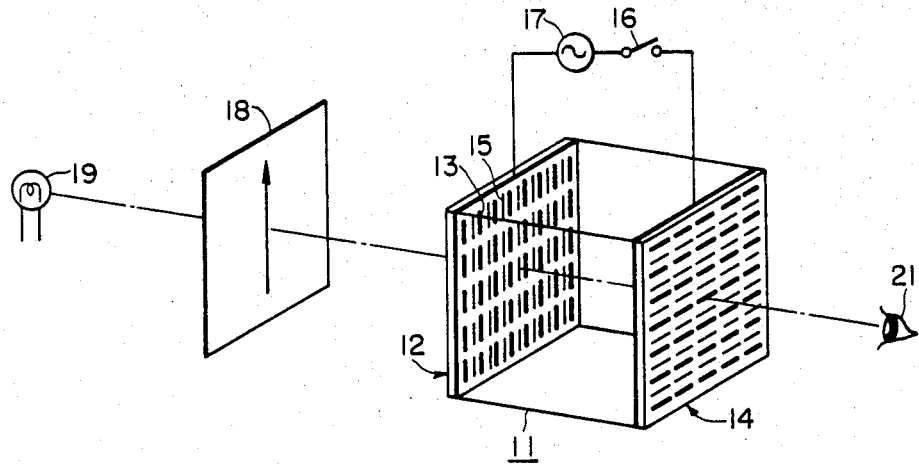
FIG. 1 is a diagram showing the arrangement of a conventional liquid crystal display element employing a dye.

To facilitate a better understanding of the present invention, a description will be given first of a liquid crystal display element heretofore employed for providing colored displays. As shown in FIG. 1, the conventional display element employs a liquid crystal cell 11 containing liquid crystal 13 in a space defined by two transparent plates 12 and 14 as of glass which are disposed in adjacent but spaced relation to each other. In the vicinity of the one transparent plate 12 of the liquid crystal cell 11, molecules of the liquid crystal 13 are orientated, for example, in a plane parallel to the transparent plate 12 and vertically, whereas in the vicinity of the other transparent plate 14 of the cell 11 they are orientated in a plane parallel to the transparent plate 14 but substantially perpendicular to the direction of orientation of the molecules of the liquid crystal 13 on the side of the transparent plate 12, i.e. horizontal in FIG. 1, thus constituting, for example, a 90° TN orientation cell. The liquid crystal 13 used is a nematic liquid crystal the dielectric anisotropy $\Delta\epsilon$ of which is positive. In the liquid crystal cell 11 an N type dye 15 is mixed in the liquid crystal 13 in such a manner that the molecules of the dye 15 may have the same orientation as the molecules of the liquid crystal 13; namely, the direction of the long axes of the molecules of the former coincides with that of the latter. As the dye 15, use is made of tetrazine,

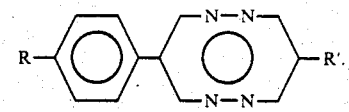

Inside of the transparent plates 12 and 14 of the liquid crystal cell 11 are disposed transparent electrodes (not shown) across which an AC power source 17 is connected via a switch 16. By controlling the switch 16, the AC power source 17 is connected to or disconnected from the liquid crystal cell 11.

Figure 2:
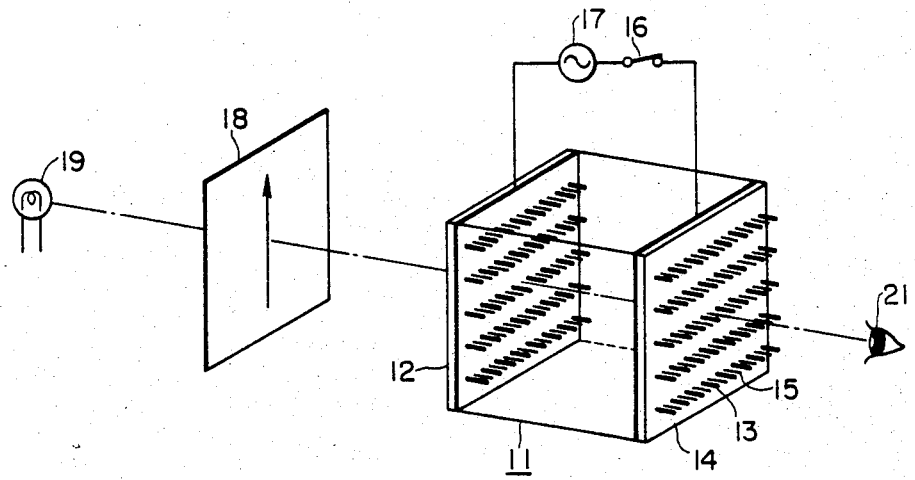
FIG. 2 is a diagram showing the state in which a voltage is applied to a liquid crystal cell in FIG. 1.

Disposed opposite the transparent plate 12 of the liquid crystal cell 11 is a colorless polarizing plate, i.e. what is called a neutral polarizing plate 18. The direction of polarization of the neutral polarizing plate 18 is selected to be the same as the direction of orientation of the molecules of the liquid crystal 13 near the transparent plate 12 of the liquid crystal cell 11. The liquid crystal cell 11 is irradiated by light from a light source 19 through the polarizing plate 18 to produce a display on the liquid crystal display element, which is observed from the side of the other transparent plate 14 of the liquid crystal cell 11, as indicated by 21. In this case, when no voltage is applied to the liquid crystal cell 11 as shown in FIG. 1, the light from the light source 19 is rendered by the polarizing plate 18 into linearly polarized light, with its direction of polarization coincident with the direction of orientation of the molecules of the liquid crystal 13 on the side of the transparent plate 12 of the liquid crystal cell 11. Consequently, the light passes through the liquid crystal cell 11, almost unabsorbed, so that the display element looks colorless and produces no display. When the switch 16 is turned ON to apply a voltage to the liquid crystal cell 11 as depicted in FIG. 2, however, the molecules of the liquid crystal 13 and the dye 15 are both aligned perpendicular to the transparent plates 12 and 14 of the liquid crystal cell 11; namely, the direction of polarization of the incident light having passed through the polarizing plate 18 is perpendicular to the long axes of the molecules of the dye 15. In consequence, some components of the incident light are absorbed by the molecules of the N type dye 15 while passing through the liquid crystal cell 11, so that the display element appears to be colored corresponding to the dye 15 in the liquid crystal cell 11.

Figure 3:
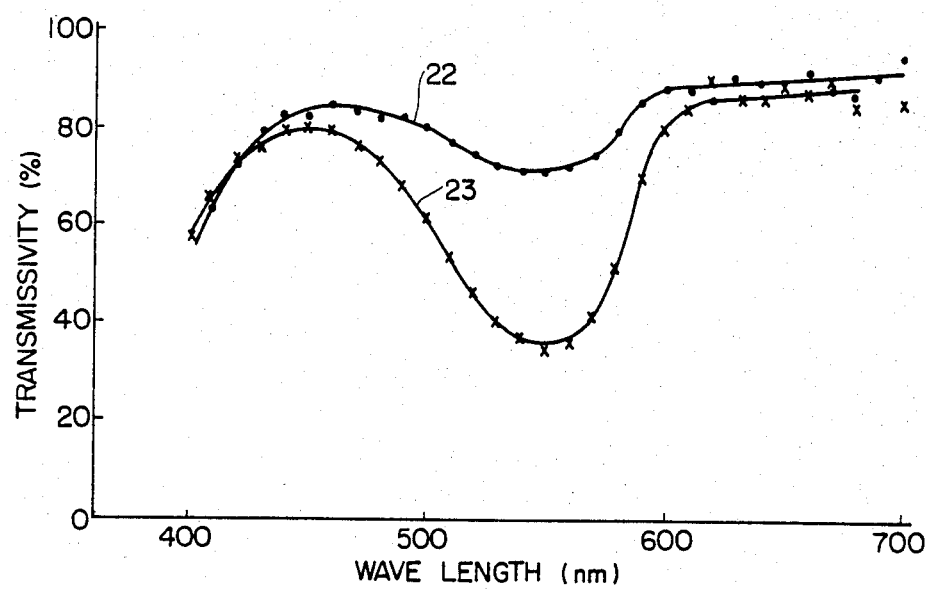
FIG. 3 is a graph showing the light transmission characteristics of the display element in the states of FIGS. 1 and 2.

The conventional liquid crystal display element of the type employing the dye provides displays of only a purple color which is given by the aforesaid tetrazine. In addition, the change in the transmissivity of the liquid crystal cell which is caused by the voltage application thereto is small. For example, as shown in FIG. 3, the transmissivity in the absence of the voltage is such as indicated by a curve 22, whereas, in the case of the voltage being applied, the transmissivity is such as indicated by a curve 23. The difference in transmissivity has proved to be as small as 35% at maximum. Accordingly, although the liquid crystal display element is designed so that a proper pattern provided on the transparent electrode attached to either transparent plate of the liquid crystal cell 11 is displayed in color by the voltage application thereto, the display is unclear, and has poor color contrast.

Figures 4, 5:
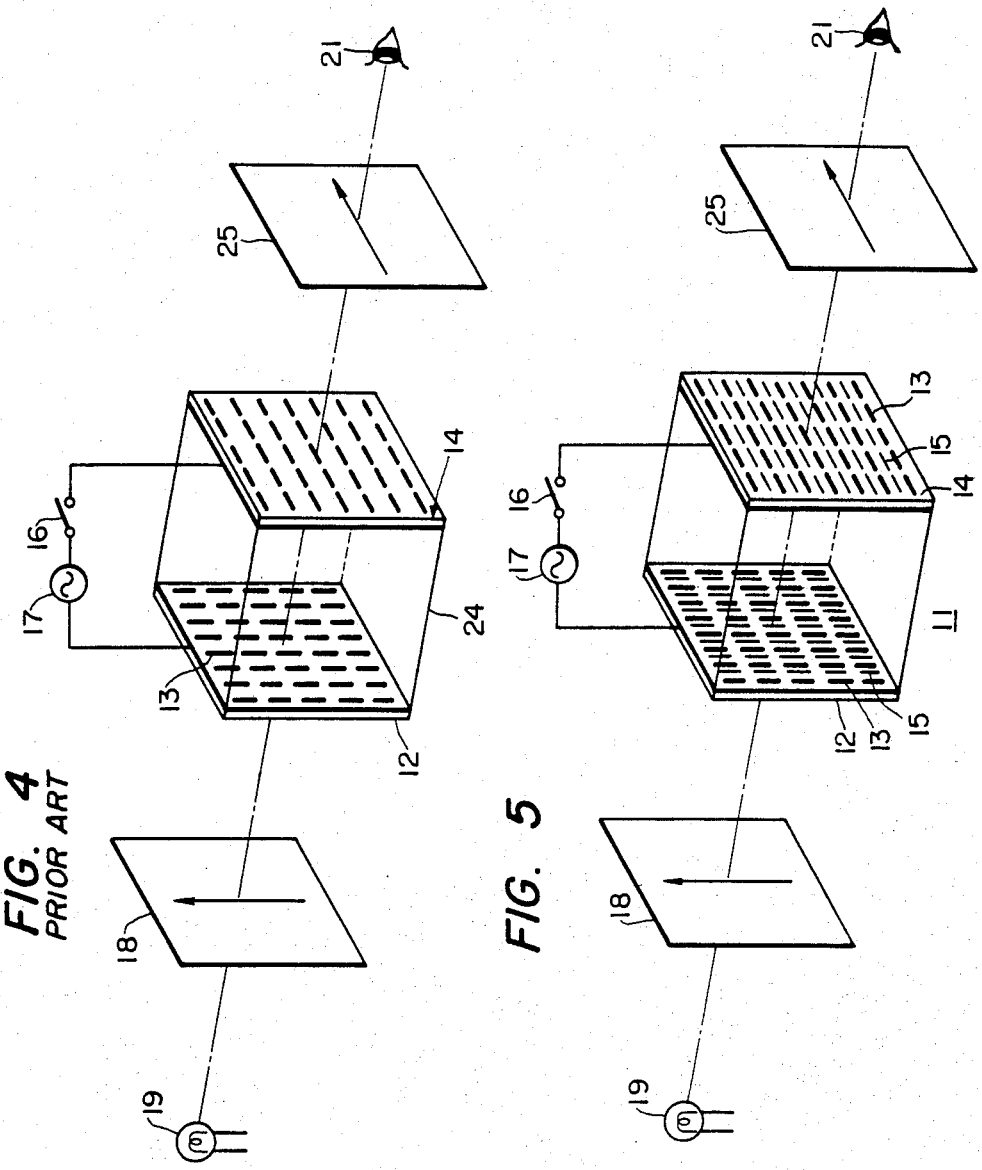
FIG. 4 is a diagram illustrating the arrangement of a conventional color liquid crystal display element employing a color polarizing plate.
FIG. 5 is a diagram illustrating the arrangement of an embodiment of the liquid crystal display element of the present invention.

On the other hand, there has also been proposed a liquid crystal display element of the type employing a liquid crystal cell with no dye mixed therein and providing colored displays through the use of a color polarizing plate. As shown in FIG. 4, a liquid crystal cell 24 employs, for example, nematic liquid crystal 13 the dielectric anisotropy $\Delta\epsilon$ of which is positive and the direction of orientation of its molecules on each of the opposing transparent plates 12 and 14 of the cell 24 is perpendicular to the direction of orientation on the other transparent plate and, further, polarizing plates 18 and 25 are disposed opposite the transparent plates 12 and 14 of the liquid cell 24, respectively. The direction of polarization of each polarizing plate is selected to be the same as the direction of orientation of the molecules of the liquid crystal on the side of the transparent plate which the polarizing plate confronts. The polarizing plate 25, which is disposed on the side of the display surface of the liquid crystal cell 11, is a color polarizing plate so that the color to be displayed can be selected by a selection of the color of the color polarizing plate used.

When no voltage is applied to the liquid cell 24, light which has passed through the polarizing plate 18 from the light source 19 is rotated 90° in its plane of polarization by the molecules of the liquid crystal 13 while passing through the liquid crystal cell 24. Consequently, the direction of the polarization of the light which has passed through the liquid crystal cell 24 coincides with the direction of polarization of the color polarizing plate 25, and hence the light passes through the polarizing plate 25 unaltered; therefore, the display element appears to be uncolored, providing no colored display. When a voltage is applied to the liquid crystal cell 24, however, the molecules of the liquid crystal 13 are orientated substantially perpendicular to the transparent plates 12 and 14 of the liquid crystal cell 24. In this case, the liquid crystal cell 24 permits the passage therethrough of the incident light without rotating its plane of polarization but the color polarizing plate 25 inhibits the passage therethrough of light except the color component of the color polarizing plate 25; namely, the color polarizing plate 25 permits the passage therethrough of only the color components of its own. Accordingly, the display element appears to be colored in the color of the color polarizing plate 25. In this way, a colored display is produced.

The prior art color liquid crystal display element shown in FIG. 4 does not utilize the light-absorbing property of molecules of a dye, that is, no dye is mixed in the liquid crystal cell 24, and it is controlled by the selective application of voltage to the liquid crystal cell 24 to determine whether or not to rotate the plane of polarization of light while it passes through the liquid crystal cell 24. Hence this display element develops a relatively sharp color contrast when compared to the display element shown in FIG. 1.

In practice, however, when the voltage is applied to the liquid crystal cell 24, the orientation of the molecules of the liquid crystal lying near the transparent plates 12 and 14 of the cell 24 is not completely perpendicular to said plates but a little inclined thereto, so that the plane of polarization of light emitted from the liquid crystal cell 24 varies with the angle of emission therefrom. Accordingly, when observed from an oblique direction through the color polarizing plate 25, the display appears light in color or, at worst, uncolored. In other words, the conventional display element is narrow in the angle which permits correct observation of the display, i.e. narrow in what is called the angle of visual field; hence, it has the defect that the display cannot be seen even when observed from a slightly oblique direction.

Next, a description will be given, with reference to FIG. 5, of an embodiment of the liquid crystal display element of the present invention. In FIG. 5, the parts corresponding to those in FIGS. 1 and 4 are identified by the same reference numerals. In the liquid crystal cell 11 for use in the liquid crystal display element of the present invention, the molecules of the liquid crystal 13 on the side of each of the transparent plates 12 and 14 are orientated at right angles to the direction of orientation on the side of the other transparent plate. The N type dye 15 is mixed in the liquid crystal cell 11 and its molecules have the same orientation as those of the liquid crystal 13. The liquid crystal 13 used is the nematic liquid crystal whose dielectric anisotropy $\Delta\epsilon$ is positive. Adjacent both transparent plates 12 and 14 of the liquid crystal cell 11 are respectively disposed the polarizing plates 18 and 25, and their directions of polarization are selected to coincide with the directions of orientation of the molecules of the liquid crystal 13 on the transparent plates 12 and 14, respectively. The polarizing plate 25 is a color polarizing plate which linearly polarizes incident light of only a specific wavelength range.

With such an arrangement, when no voltage is applied across transparent electrodes (not shown) of the liquid cell 11, the polarizing plate 18 permits, in this example, the passage therethrough of only vertically polarized light from the light source 19, and the liquid crystal cell rotates the plane of polarization of the light through 90°. Consequently, the direction of polarization of the light having passed through the liquid crystal cell 11 is the same as the direction of polarization of the color polarizing plate 25, and hence passes through the color polarizing plate 25. Thus, the light of all color components, from the light source 19, is incident on the eye 21; the display element appears transparent, providing no display.

When the AC voltage is provided via the switch 16 to the liquid crystal cell 11, the molecules of the liquid crystal 13 and the dye 15 are orientated with their long axes substantially perpendicular to the transparent plates 12 and 14. In consequence, the light which has passed through the polarizing plate 18 is greatly absorbed by the molecules of the dye 15 in a given wavelength range while passing through the liquid crystal cell 11 and since the plane of polarization of the remaining unabsorbed light is not rotated in the liquid crystal cell 11, its direction of polarization is perpendicular to the direction of polarization of the color polarizing plate 25; therefore, the light incident on the color polarizing plate 25 does not pass therethrough except for light of the same color component as that of the color polarizing plate 25. Accordingly, the display in this case is produced by a combination of the transmission characteristic of the dye 15 in the voltage-applied state and the transmission characteristic of the color polarizing plate 25. If a neutral polarizing plate is employed in place of the color polarizing plate 25, when the voltage is applied to the liquid crystal cell, no light passes through the polarizing plate and the display surface appears in black.

Figure 11:
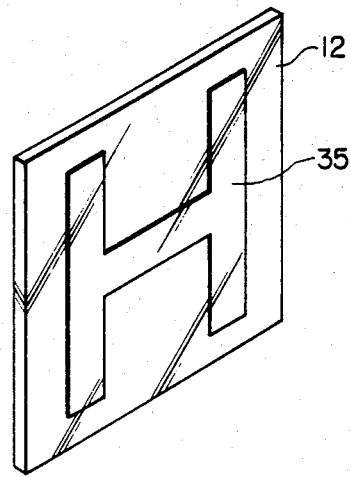
FIG. 11 is a perspective view of one of the side plates of the liquid crystal cell on which a transparent electrode is formed in an "H" pattern.
Figure 12A:
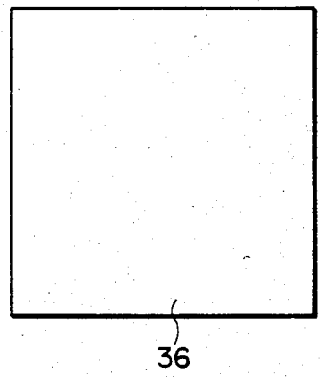
FIGS. 12A and 12B are diagrams illustrating display states of the liquid crystal display element employing the electrode shown in FIG. 11, where the electrode is being applied with no voltage and with a voltage, respectively.
Figure 12B:
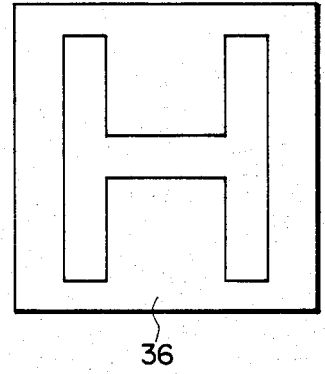

As will be appreciated from the above, where a transparent electrode 35 is formed in the pattern of, for example, a letter H on the transparent plate 12 of the liquid crystal cell 11 in the abovesaid arrangement as shown in FIG. 11, when no voltage is applied to the liquid crystal cell 11, no display is provided, as depicted in FIG. 12A. By the voltage application to the liquid crystal cell 11, however, the H-letter pattern of the transparent electrode is displayed, as shown in FIG. 12B.

With the display element of the present invention, when the voltage is applied to the liquid crystal cell 11, the incident light is absorbed by the dye 15 in the cell 11 and its direction of polarization is held unchanged, so that the light except the color component of the color polarizing plate is thereby intercepted; accordingly, the light transmissivity of the display element is very small. In other words, the difference in the light transmissivity between the cases of the voltage application and the non-voltage application is very large, providing a good contrast in the display.

Figure 6:
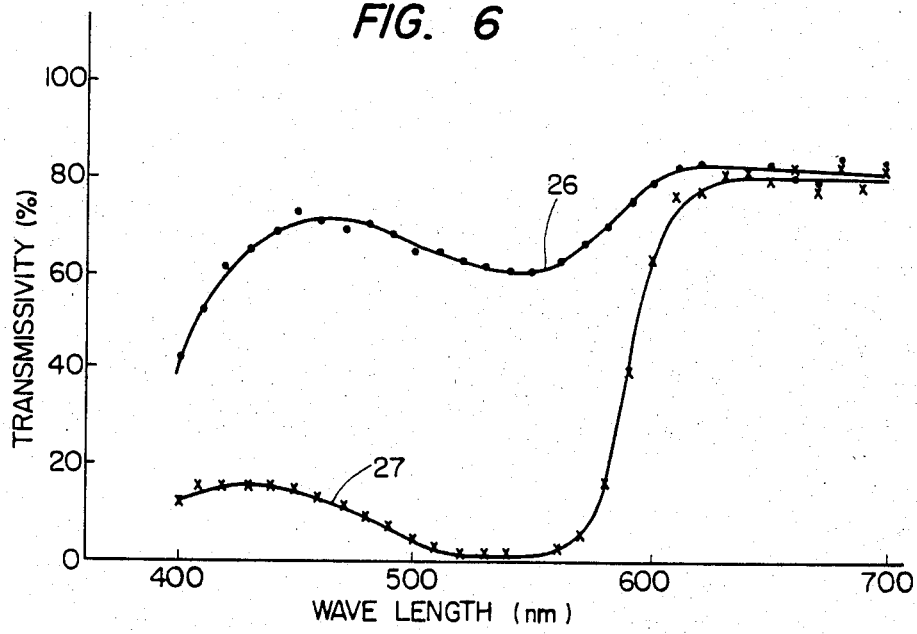
FIGS. 6 to 8 are graphs showing the light transmission characteristics of the liquid crystal display elements of the present invention respectively employing various color polarizing plates.

For example, where use is made of tetrazine as the dye 15 and a red color polarizing plate as the color polarizing plate 25, the light transmissivity in the case of no voltage being applied to the cell 11 is such as indicated by the curve 26 in FIG. 6 and the light transmissivity in the case of the voltage being applied is such as indicated by the curve 27. The difference in transmissivity is as large as about 60%, which is far larger than that shown in FIG. 3. If use is made of a red color polarizing plate the transmission characteristic of which substantially coincides with a red color transmission region of the transmissivity-wavelength characteristic of the dye shown by the curve 23 in FIG. 3, then the red color component mostly passes through the color polarizing plate when the voltage is applied to the liquid crystal cell and consequently this display element provides a display in a bright red color. Since the colored display by the dye can always be seen regardless of the direction of observation, the display can be seen even from a direction in which the colored display by the color polarizing plate 25 cannot be seen.

Figure 7:
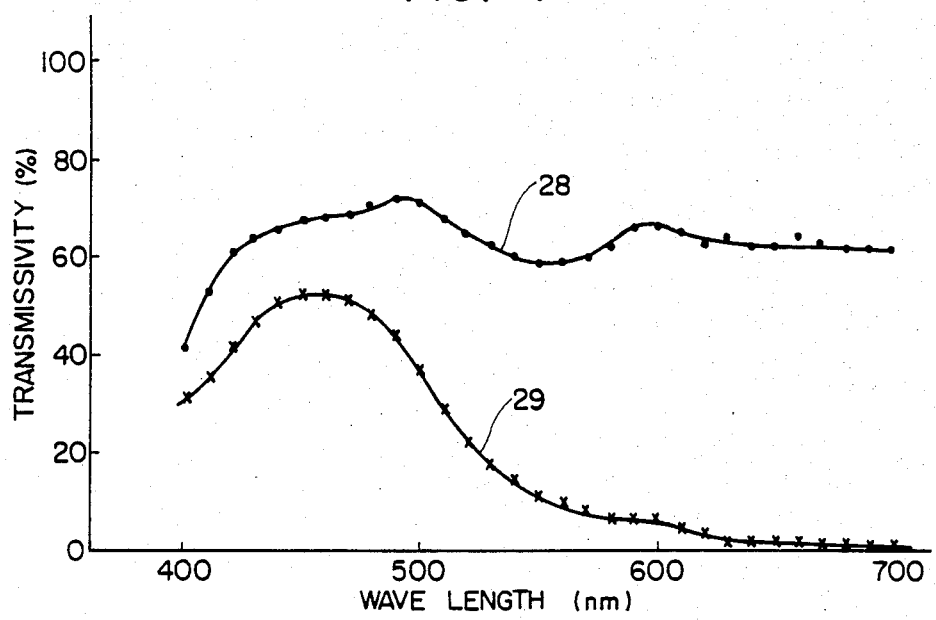
Figure 8:
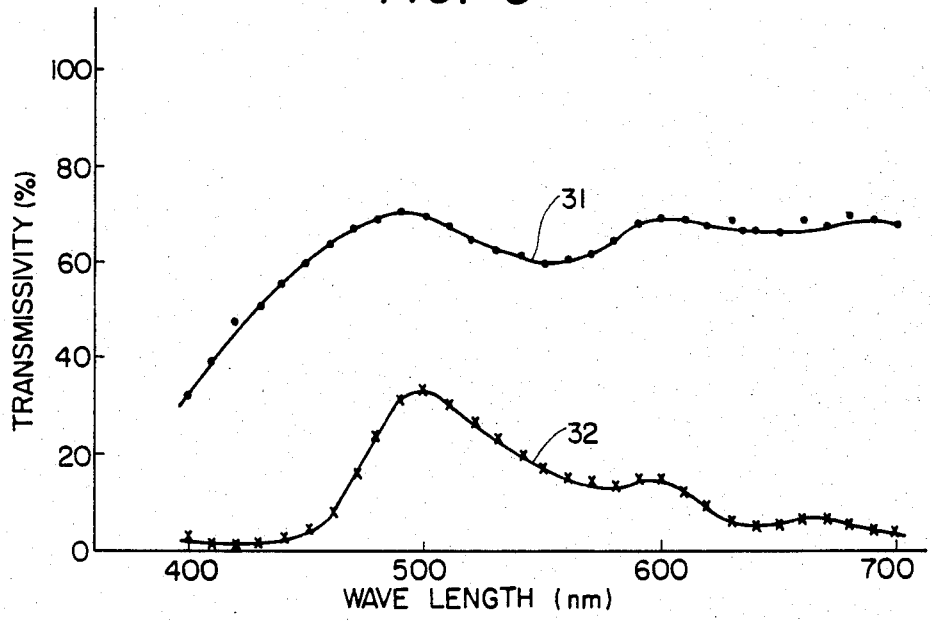

In the case of using, as the color polarizing plate 25, a blue color polarizing plate which has a transmission characteristic overlapping a blue color transmission region of the transmission characteristic of the dye shown by the curve 23 in FIG. 3, the display element presents such light transmissivity as indicated by the curve 28 in FIG. 7 when no voltage is applied to the liquid crystal cell 24, and such light transmissivity as indicated by the curve 29 when the voltage is applied to the liquid crystal cell 24. Also in this case, the difference in the transmissivity is approximately 60%, which is larger than that in the prior art. It will also be seen from the wavelength characteristic shown in FIG. 7 that even if the voltage is applied to the liquid crystal cell 11, a blue color component passes therethrough to produce a display in a color close to blue. Moreover, it is also possible that in the case of using a green color polarizing plate as the color polarizing plate 25, the display element exhibits such transmissivity as indicated by the curve 31 in FIG. 8 when no voltage is applied to the liquid crystal cell 24 and such transmissivity as indicated by the curve 32 when the voltage is applied to the liquid crystal cell 24. Also in this case, the transmissivity difference is large at the regions which correspond to short and long wavelengths and the intermediate color components close to green appreciably pass through the liquid crystal cell 24 even when the voltage is applied thereto, providing a display in a color close to green.

In FIGS. 3 and 6 to 8, the applied voltage is a square wave of 32 Hz, 5 V; the liquid crystal is GR.63WM; and the dye is tetrazine.

As described above, according to the liquid crystal display element of the present invention, if a patterned electrode is used as the transparent electrode, there is a large difference in transmissivity between the voltage applied portion and the non-voltage-applied portion of the transparent electrode, producing a display with good contrast. In addition, the display can be provided in various colors by selecting the color of the color polarizing plate 25. Since the light transmission control is performed by the combined use of the direction of polarization and the absorptivity by the dye and since the light absorption by the dye is not affected by the direction of observation of the display element, a display can be provided over a wide angle of visual field.

As described previously, this liquid crystal display element is capable of providing displays in various kinds of colors by selecting the color of the color polarizing plate 25. When a colorless polarizing plate is used as the polarizing plate 25, a monochrome display is produced. In this case, the monochrome display is produced with good contrast over a wide angle of visual field.

While in the foregoing embodiment the N type dye is used, it may also be used together with a P type dye. For example, as shown in FIG. 9, the liquid crystal 13, the dye 15 and a P type dye 33 the molecules of which have the same orientation as the molecules of the liquid crystal 13 are mixed in the liquid crystal cell 11. The molecules of the dye 33 effectively absorb polarized light parallel to their long axes, so that when no voltage is applied to the liquid crystal cell 11, the light which has passed through the polarizing plate 18 is absorbed by the molecules of the P type dye 33, providing a display in the color corresponding to the dye 33. When the voltage is applied to the liquid crystal cell 11, the molecules of the liquid crystal 13 and the dyes 15 and 33 are orientated with their long axes aligned perpendicular to the transparent plates 12 and 14 of the liquid crystal cell 11 and the molecules of the P type dye 33 hardly absorb polarized light perpendicular to their long axes, so that the light is absorbed by the N type dye 15, as described previously, thus providing the display in the color depending on the transmission characteristics of the N type dye 15 and the polarizing plate 25. Accordingly, if a pattern is formed on either of the transparent electrodes of the liquid crystal cell 11, when no voltage is supplied thereto the entire area of the display surface is displayed in, for example, yellow by the P type dye 33; and when the voltage is applied, the pattern is displayed in the color which is determined by the N type dye 15 and the polarizing plate 25, for example, in blue on a yellow background. In other words, a colored pattern is displayed on the background of a color different from the pattern.

In order to color both the background and the display pattern as described above, it is also possible to employ an arrangement such as is shown in FIG. 10. That is, in the arrangement of FIG. 5, another color polarizing plate 34 is disposed adjacent the polarizing plate 25 on the opposite side from the liquid crystal cell 11 and the direction of polarization of the polarizing plate 34 is selected at right angles to that of the polarizing plate 25 and, further, the colors of the polarizing plates 25 and 34 are selected to be different from each other. With such an arrangement, when no voltage is applied to the liquid crystal cell 11, the entire area of the display element appears in the color of the polarizing plate 34, that is, the background is colored in the color of the polarizing plate 34, and when the voltage is applied to the liquid crystal cell 11, the pattern is displayed in the color determined by the polarizing plate 25.

It is also possible to mix the P type dye in the liquid crystal cell 11 of FIG. 10 as shown in FIG. 9 including the color polarizing plate 34. In such a case, when no voltage is applied to the liquid crystal cell 11, the display is produced in the color which is determined by the P type dye and the color polarizing plate 34, whereas, when the voltage is applied, the display is produced in the color which is determined by the N type dye and the color polarizing plate 25. Accordingly, a wide variety of color displays can be achieved by combinations of such dyes and color polarizing plates, and the displayed pattern and the background color are both small in the visual angle dependency of the color being displayed.

The polarizing plates 18, 25 and 34 can be attached to the transparent plates 12 and 14 of the liquid crystal cell 11 or formed by printing techniques. In this case, a polarizing plate of the same color need not always be provided over the entire area of one transparent plate of the cell 11 but polarizing plates of different colors may also be mounted on each transparent plate of the cell 11.

The terms "N type dye" or "N type dichroic dye" used in the preceding description and in the appended claims are intended to mean a dichroic dye having negative dichroism.

It will be apparent that many modifications and variations may be effected without departing from the scope of the novel concepts of this invention.

What is claimed is:

1. A liquid crystal display element comprising:
   a nematic liquid crystal cell comprising a pair of spaced opposing side plates which define a region therebetween containing a nematic liquid crystal having liquid crystal molecules, a positive dielectric anisotropy, and an N type dichroic dye mixed therein,
   a transparent electrode located on an inner surface of each of said opposing side plates to which electrodes a voltage may be applied to said cell, at least one of said transparent electrodes being formed in a pattern to be displayed,
   the molecules of the liquid crystal near the respective side plates of the liquid crystal cell having orientations which are substantially parallel to the respective side plates but perpendicular to each other to form a twisted nematic structure, molecules of the N type dichroic dye having the same orientation as the molecules of the liquid crystal, and the molecules of both the liquid crystal and the N type dichroic dye being oriented substantially at right angles to the planes of the respective side plates of the liquid crystal cell when a voltage is applied to said cell;
   a neutral polarizing plate disposed opposite one of the side plates of the liquid crystal cell and having a direction of polarization substantially parallel to the orientation of the molecules of the liquid crystal and the N type dichroic dye near said side plate to exhibit a substantially uniform polarizing characteristic over a visible wavelength region; and
   a color polarizing plate disposed adjacent the other side plate of the liquid crystal cell and having a direction of polarization substantially parallel to the orientation of the molecules of the liquid crystal and the N type dichroic dye on said other side plate to exhibit a polarizing characteristic over a specific wavelength region;
   said display element being operative, upon application of a voltage across said transparent electrodes, to display said pattern in a mixed color resulting from said N type dichroic dye and said color polarizing plate.

2. A liquid crystal display element according to claim 1 wherein the liquid crystal cell also has mixed therein a P type dye the molecules of which have the same orientation as the molecules of the liquid crystal.

3. A liquid crystal display element according to claim 2 including a further color polarizing plate which is disposed opposite the first-mentioned color polarizing plate, said further color polarizing plate having a direction of polarization which is substantially perpendicular to that of the first-mentioned color polarizing plate and being different in color therefrom.

4. A liquid crystal display element according to claim 3 wherein at least one of the two color polarizing plates and at least one of the N type dichroic and P type dyes are selected so that at least one transmission region may be provided in common to a high transmissivity region in the transmission characteristic of the liquid crystal cell in the state of the voltage application thereto and a high transmissivity region in the transmission characteristic of the color polarizing plate for polarized light perpendicular to the direction of polarization of said at least one of the two color polarizing plates.

5. A liquid crystal display element according to claim 1 including a further color polarizing plate which is disposed opposite the first-mentioned color polarizing plate, said further color polarizing plate having a direction of polarization which is substantially perpendicular to that of the first-mentioned color polarizing plate and being different in color therefrom.

6. A liquid crystal display element according to claim 1 or 5 wherein the color polarizing plate of claim 1 and the dye are selected so that at least one transmission region may be provided in common to a high transmissivity region in the transmission characteristic of the liquid crystal cell in the state of the voltage application thereto and a high transmissivity region in the transmission characteristic of the color polarizing plate for polarized light perpendicular to the direction of polarization of the color polarizing plate.

* * * * *